United States Patent [19]

Yoshihara

[11] Patent Number: 6,017,612
[45] Date of Patent: Jan. 25, 2000

[54] POLYESTER FILM FOR DECORATIVE PLATES OR DECORATIVE SHEETS

[75] Inventor: Kenji Yoshihara, Shiga-ken, Japan

[73] Assignee: Mitsubishi Polyester Film Corporation, Tokyo, Japan

[21] Appl. No.: 09/062,652

[22] Filed: Apr. 20, 1998

[30] Foreign Application Priority Data

Apr. 23, 1997 [JP] Japan ..................................... 9-120166
Jun. 25, 1997 [JP] Japan ..................................... 9-168481

[51] Int. Cl.⁷ ....................................................... B32B 9/00
[52] U.S. Cl. ......................... 428/195; 428/203; 428/206; 428/207; 428/326; 428/353; 428/354; 428/411.1; 428/423.7; 428/480; 428/483; 428/535; 428/913; 156/85; 156/239; 156/240; 8/467
[58] Field of Search ...................................... 428/195, 203, 428/206, 207, 480, 914, 913, 483, 354, 326, 353, 535, 423.7, 411.1; 156/85, 240, 239; 8/467

[56] References Cited

U.S. PATENT DOCUMENTS

| | | | |
|---|---|---|---|
| 4,715,913 | 12/1987 | Middleton | 156/85 |
| 5,171,625 | 12/1992 | Newton | 428/195 |

FOREIGN PATENT DOCUMENTS

| | | |
|---|---|---|
| 249 109 | 12/1987 | European Pat. Off. . |
| 588 276 | 3/1994 | European Pat. Off. . |
| 0 783 962 | 7/1997 | European Pat. Off. . |
| 0 389 856 | 5/1998 | European Pat. Off. . |
| KOKAI-5116251 | 5/1993 | Japan . |
| KOKAI-717005 | 1/1995 | Japan . |
| 09187903 | 7/1997 | Japan . |
| 09226086 | 9/1997 | Japan . |

OTHER PUBLICATIONS

Patent Abstracts of Japan, vol. 096/No. 009, Sep. 30 1996 & JP 08 112887 A (Dainippon Printing Co., Ltd.), May 7, 1996–Abstract.

Database WPI, Section Ch, Week 9614, Derwent Publiations Ltd., London, GB; AN 96–134904 XP002107387–Abstract.

Database WPI, Section Ch, Week 9728, Derwent Publications Ltd., London, GB; AN 97–306081 XP002107388–Abstract.

*Primary Examiner*—Deborah Jones
*Assistant Examiner*—Abraham Bahta
*Attorney, Agent, or Firm*—Foley & Lardner

[57] ABSTRACT

The present invention relates to a decorative sheet comprising at least a polyester film layer and a picture-printed layer laminated on the polyester film layer, a migration value in the surface of the polyester film layer which contacts the picture-printed layer being 0 to 30.

6 Claims, No Drawings

POLYESTER FILM FOR DECORATIVE PLATES OR DECORATIVE SHEETS

BACKGROUND OF THE INVENTION

The present invention relates to a polyester film for decorative plates or decorative sheets. The term "decorative plates" used in the present invention usually means building materials (facing materials) which comprise at least a film layer and a picture-printed layer laminated successively on the surface of a base of various kinds of commercial products such as, typically, furniture, building materials and home appliances, and which building materials are handled as an independent commercial product. The "decorative sheets" mean the decorative materials (facing materials) which have a picture printed surface layer and which are laminated to the surfaces of the bases. Therefore, the film layer and the picture-printed layer formed on the base surfaces of the decorative plates are an element constituting the decorative sheets.

Vinyl chloride resin sheets are the most popularly used as the sheet interposed between the base and the picture-printed layer of the decorative plates, and as the sheet (film) used for the decorative sheets. Practical use of such vinyl chloride resin sheets, however, involve some serious problems. For instance, the plasticizer contained in the sheets may migrate into the adhesive layer at the interface of lamination to cause improper or imperfect adhesion at the interface. Also, such vinyl chloride resin sheets are liable to thermal expansion and contraction because of their poor thermal dimensional stability and may be wrinkled when exposed to a cold or hot environment. Further, these vinyl chloride resin sheets generate chlorine when incinerated and the waste thereof is considered responsible for acid rain and generation of dioxin. Under these circumstances, request is rising for the development of the decorative plates and decorative sheets using no such problematic vinyl chloride resin sheets from the standpoint, in particular, of environmental protection.

Since the decorative plates or decorative sheets are used as facing material, usually a picture with a sophisticated or aesthetic design effect is applied on their surface. Therefore, proper adjustment of tonality is essential for producing a fine contrast of the picture or shading. A large variety of materials such as, typically, particle board and steel plates are used for the base of the decorative plates or the base to which the decorative sheets are to be laminated, and the tonality of these bases is also diversified even if they are made of a same material. Therefore, if the opacifying or hiding power of the sheet material used for the decorative sheets is low, the tonality or color tone of the base affects the tonality of the decorative sheet surface to spoil its original ornamental effect.

Therefore, a decorative sheet (film) having proper opacifying properties is desired for allowing wider application of such sheet to the bases of various tints.

Ligneous materials are preferred for furniture, building materials, home appliances and or the like, for which the decorative sheets are used as facing material. Therefore, it is desired that a sheet material of a tinge capable of affording a ligneous impression be used for the decorative sheets.

Further, since the decorative plates or sheets are used as facing material, there is high probability that such plates and sheets would contact or touch various other objects in use. For instance, in case where the decorative plates or sheets are used as facing material of a door in construction of a house, they are subjected to frequent occasions of contact with, for example, the tools, machine parts and such carried in by the house builder, or with the corner of a furnishing when brought into the room. Even in the everyday life, there are many occasions of such contact, for example, bumping of the corner of the intake block of a vacuum cleaner against the facing material. Such contact with other objects often causes fouling or scratch to the decorative sheet. Here, the term "fouling" is used to refer to a mark which has been transferred from the contacted object to the decorative sheet surface and distinguished from the original picture of the decorative sheet. The "scratch" means damage creating unevenness or dent on the sheet surface which does not harmonize with the sheet picture. It is distinguished from the picture since light reflection from the uneven portion is different from that from the surrounding part of the picture. Both fouling and scratch deteriorate the design effect of the decorative plates and sheets. Especially scratch causes a serious problem in which it damages the decorative sheet surface and which problem can not be eliminated unless the sheet is changed. Thus, a decorative plate or sheet which is resistant to damage by contact with other objects has been desired.

In a picture printer, there are provided, separately from the rolls for adjusting the film tension, the rolls for preventing the printed picture on the film from contacting the drying oven. So, if the color of the film surface is transferred to the roll surface, the hue of the film surface is altered, making it difficult to control tonality. Productivity is also hampered as the rolls need to be cleaned. Thus, in the industry for a decorative plate or sheet, there is a strong request which, in its production using a picture printer, allows easy control of tonality of the film surface and which is also capable of preventing color transfer to the roll surface in the picture printer, and there is no problem in which the productivity is impaired by the external factors.

Biaxially oriented polyester films represented by polyethylene terephthalate film are used in many fields for their excellent properties. However, no proposal has ever been made on use of a biaxially oriented polyester film as an intermediate between the base and the picture-printed layer, which polyester film is capable of preventing color transfer to the roll surface in the picture printing operation, although there have been a proposal on use of a polyester film as a facing member of decorative plates in Japanese Patent Application Laid-Open (KOKAI) No. 7-17005 and a proposal on application of a polyester film for a colored opaque resin-made decorative sheet in Japanese Patent Application Laid-Open (KOKAI) No. 5-116251.

As a result of the present inventors earnest studies to solve the above problems, it has been found that in the production of decorative sheets comprising at least a polyester film layer having a specified migration value and a picture-printed layer, and the decorative plates comprising the said sheets laminated to a base, it is possible to prevent transfer of the color of the film surface to the roll surface in the picture printer; and that the decorative sheets comprising a polyester film layer having a specific transmission density and chromaticity, a picture-printed layer and a surface hardened layer having a specific Rockwell hardness and the decorative plates comprising such sheets laminated to a base are capable of presenting the high design quality and also highly resistant to damage.

The present invention has been attained on the basis of the above finding.

SUMMARY OF THE INVENTION

The first object of the present invention is to provide a film for decorative plates or decorative sheets, which causes no environmental problem when incinerated, allows easy control of tonality of the film surface, is capable of preventing color transfer to the roll surface in the picture printing operation, and is produced while the productivity being unaffected by external factors.

The second object of the present invention is to provide a decorative plate and a decorative sheet which causes no environmental problem when incinerated, are capable of presenting a picture with the original design effect without being affected by the hue of the base, and are not easily damaged by contact with other objects.

To accomplish the aim, in a first aspect of the present invention, there is provided a decorative sheet comprising at least a polyester film layer and a picture-printed layer laminated on the polyester film layer, a migration value in the surface of the polyester film layer which contacts with the picture-printed layer being 0 to 30.

In a second aspect of the present invention, there is provided a decorative plate comprising at least a polyester film layer and a picture-printed layer which are laminated successively in this order on the surface of a base, a migration value of the surface of the polyester film layer which contacts with the picture-printed layer being 0 to 30.

In a third aspect of the present invention, there is provided a decorative sheet comprising a polyester film layer, a picture-printed layer and a surface hardened layer which are laminated successively in this order, a transmission density of the said polyester film layer being 0.1 to 5.0, the b value of chromaticity being −5.0 or more, and the Rockwell hardness of the said surface hardened layer being 40 to 130.

In a fourth aspect of the present invention, there is provided a decorative plate comprising a polyester film layer, a picture-printed layer and a surface hardened layer which are laminated successively in this order on the surface of a base, a transmission density of the said polyester film layer being 0.1 to 5.0, the b value of chromaticity being −5.0 or more, and the Rockwell hardness of the said surface hardened layer being 40 to 130.

DETAILED DESCRIPTION OF THE INVENTION

The present invention is described in detail below.

When the term "polyester" is used in the present invention, it refers to polyesters having ester groups obtained by polycondensation of dicarboxylic acids and diols or hydroxycarboxylic acids.

Examples of the said dicarboxylic acids include terephthalic acid, isophthalic acid, adipic acid, azelaic acid, sebacic acid, 2,6-naphthalenedicarboxylic acid and 1,4-cyclohexanedicarboxylic acid. Examples of the said diols include ethylene glycol, 1,4-butanediol, diethylene glycol, triethylene glycol, neopentyl glycol, 1,4-cyclohexanedimethanol and polyethylene glycol. Examples of the hydroxycarboxylic acids include p-hydroxybenzoic acid and 6-hydroxy-2-naphthoic acid.

Typical examples of polyester are polyethylene terephthalate and polyethylene-2,6-naphthalate. The polyester used in the present invention may be a homopolymer or a copolymer obtained by copolymerizing a third component.

The decorative sheet and the decorative plate representing the first and second aspects of the present invention are explained below.

The polyester film in the first and second aspects of the present invention is featured in a small migration value which is a parameter of susceptiveness of color transfer to the roll surface in the picture printer. In the present invention, the migration value of the polyester film is 0 to 30, preferably 0 to 20.

The above-mentioned migration value is the value determined by the following migration test. A white polyvinylchloride film containing 50 to 60 parts by weight of a plasticizer is placed on a polyester film to be tested in parallel and these films are hot pressed at 180° C. under a pressure of 5 kg/cm$^2$ for one minute. The pressed sheet is cured in a temperature- and humidity-controlled chamber set at 60° C. and 90% RH for 5 days. The cured polyester film is separated from the white polyvinylchloride film and the hues (L, a, b) of the polyester film at the peeled section are measured by a differential calorimeter. The color differences of the respective hues (ΔL, Δa and Δb) are determined from the following formulae (1) to (3), and the square root of the sum of the squares of ΔL, Δa and Δb is calculated (formula (4)). The thus determined value is here represented as migration value (formula (5)).

$$\Delta L = L - L_0 \quad (1)$$

$$\Delta a = a - a_0 \quad (2)$$

$$\Delta b = b - b_0 \quad (3)$$

$$\Delta E = (\Delta L^2 + \Delta a^2 + \Delta b^2)^{1/2} \quad (4)$$

$$\text{Migration value} = \Delta E \quad (5)$$

In the above formulae, L, a and b are the hues of the peeled section of the polyester film after hot press and curing, and $L_0$, $a_0$ and $b_0$ are the hues of the polyester film surface before subjected to hot press and curing.

The migration value: 0 means no color of the polyester film surface transfer to the roll surfaces in the picture printer.

When the migration value exceeds 30, the polyester film surface color is remarkably transferred to the roll surface, and the color tone of the film surface becomes changeable irregularly, whereby it is difficult to control the tonality of the decorative sheet and the productivity is also impaired because of the necessity of cleaning the rolls in the picture printing mechanism.

In the first and second aspect of the present invention, it is essential that the migration on at least the side of the film layer which contacts with the picture-printed layer is in the range of 0 to 30. The migration value on the other side is not specified, but it may, for instance, be in the above-defined range of 0 to 30. Regarding the film structure, the polyester film may be comprises a single layer alone or may have a structure comprising two layers or more. A single layer having the same migration value on both sides or a structure comprising 3 layers of two types is preferable because, in this case, there is no need of giving specific attention to the side to be printed during process of the film.

In order to control the tonality of the film, the polyester films according to the first and second aspects preferably contain pigment and/or dye. The migration value increases as the increase of the transferring amount of the pigment or dye contained in the film to the other object, for example, the roll surfaces in the picture printer. Therefore, for example, there are methods for controlling the migration value as follows. The method comprises providing a tonality to the film by using a pigment or dye which is hard to bleed out, or the method comprises laminating a layer containing no pigment nor dye on the film.

The decorative sheet according to the first aspect can be applied to the bases of various tints. Therefore, it is preferable that the polyester films used in the first and second aspects have appropriate opacifying power so as to prevent the color tone of the decorative sheet from being changed according to the tonality of the so as to maintain its design quality. Then, the polyester films used in the first and second aspects, have a transmission density, as a factor indicating the opacifying power, in the range of usually 0.1 to 5.0, preferably 0.2 to 4.0, more preferably 0.5 to 3.0.

The above-mentioned opacifying properties can be generally achieved by containing inorganic or organic particles in the film. As examples of the particle materials usable for this purpose, there can be mentioned titanium dioxide, calcium carbonate, barium sulfate, aluminum oxide, silicon dioxide, carbon black, iron oxide and chromium oxide. Other materials can be used as far as the above-mentioned transmission density is satisfied.

As for the method for affording opacifying properties to the film, it is preferable to use a method in which the polyester film is allowed to contain the small closed cells. This method is conducted, for example, by adding to polyester a small quantity of polyolefin which is incompatible with the polyester and then drawing and heat setting the film, or by having an inert gas contained in the polyester film.

In case where the transmission density of the polyester film is less than 0.1, the color tone of the base may affect that of the picture of the decorative sheet surface and the control of tonality may be difficult. In case where the transmission density of the polyester film exceeds 5.0, break of the film tends to occur frequency during manufacture of the film and the mechanical strength of the polyester film may lower.

By use of the polyester film according to the first and second aspects, it is prevented to transfer of the film color to the roll surface in the picture printer, making it possible to keep free from influence of the tint of the base and to present a surface picture with intact design effect on the decorative sheet. Therefore, by laminating to the base surface a decorative sheet obtained by printing a picture on the polyester film of the first and second aspects, it is possible to attain so-called single-layer face printing. The said decorative sheet is particularly useful for application to building materials, furniture, home appliances and the like. In front-printing decorative sheet, picture printing may be conducted after applying opacifying printing on the polyester film, or embossing may be performed after picture printing, followed by top coating.

Since the polyester films of the first and second aspects have excellent opacifying properties, it is possible to conduct front-printing decorative sheet with a one-layer polyester film as described above, but a polyester film of two or more layers is also usable. For example, a plural number of the polyester films of the first and second aspects may be laminated to the base such as plywood. Such multilayer structure facilitates embossing of the sheet surface.

Generally, ligneous materials are preferred for furniture, building materials, home appliances and such. That is, people fancy ligneous color tone because they can obtain spiritual peace of mind from a space surrounded with ligneous tonality generated by a Japanese style house. In such a case, it is preferable to coordinate the color tone of the polyester film itself in addition to its color transfer inhibiting properties and opacifying properties.

In the first and second aspects of the present invention, the b value of chromaticity of the polyester film is usually −5.0 or more, preferably −4.0 or more, more preferably −3.0 or more. When the b value of chromaticity is less than −5.0, the film has a tendency to increase in whiteness to assume a bluish tint. Especially where it is required to provide the color tone possessed by the ordinary ligneous materials, it is preferred to set the b value of chromaticity in the range of −5.0 to 50.0 because this range of b value can minimize the influence of color tone of the surface material to facilitate adjustment of the tint of the decorative sheet surface.

The decorative sheet and the decorative plate offered as the third and fourth aspects of the present invention are explained below.

As mentioned above, decorative sheets are widely applied to the bases having various tints. Therefore, for the decorative sheets and plates of the third and fourth aspects, it is essential to use a polyester film having an appropriate opacifying power so as to prevent the decorative sheet from being changed in its color tone according to the tint of the base to maintain its original design quality.

Therefore, the polyester films used in the third and fourth aspects of the present invention have a transmission density in the range of 0.1 to 5.0, preferably 0.2 to 4.0, more preferably 0.5 to 3.0. When the transmission density of the polyester film is less than 0.1, the tint of the base to which the polyester film is laminated affects the color tone of the picture on the decorative sheet surface and the object of the present invention may not be attained. In case where the transmission density of the polyester film exceeds 5.0, the film frequently beaks during manufacture of the film and mechanical strength of the polyester film lowers.

The opacifying properties represented by the said transmission density can be attained by the methods, such as having the particles or small closed cells contained in the film, explained in the first and second aspects of the present invention.

By use of the decorative sheets and plates of the first and second aspects, it is possible to present a surface picture with high design quality by keeping off the influence of the color tone of the base, and such decorative sheets and plates can be advantageously used for surface decoration of building materials, furniture, home appliances and such.

As explained in the first and second aspects of the present invention, it is preferable to coordinate the color tone of the polyester film itself to that of base in addition to its opacifying properties.

In the decorative sheets according to the third aspect and the decorative plates according to the fourth aspect of the present invention, the b value of chromaticity of the polyester film is −5.0 or more, preferably −4.0 or more, more preferably −3.0 or more. When the b value of chromaticity is less than −5.0, whiteness may be increased so that the film has a bluish tint. Especially, in case where it is required to yield a color tone possessed by ordinary ligneous materials, the above-defined range of the b value is effective for minimizing the influence of color tone of the surface material to facilitate adjustment of the surface tint of the decorative sheets and the decorative plates produced by laminating the decorative sheets to the base.

The decorative sheets and plates of the third and fourth aspects can be obtained by laminating a single layer of polyester film having the said opacifying properties and hue and a picture-printed layer, but the same polyester films may be laminated in layers to increase the opacifying effect. Also, an opacifying layer having a preferred opacifying power and/or an undercoat for making the picture clearer may be interposed between the polyester film and the picture-printed layer.

The decorative sheets of the third aspect are provided with a picture-printed layer as these sheets are usually used as facing of building materials and required to present an high-grade design quality. As the ink used fop providing such a picture-printed layer, there can be used the conventional inks, such as inks prepared by adding a colorant(s) such as a dye or a pigment to an ink vehicle, optionally adding suitable additives such as plasticizer, stabilizer, wax, grease, desiccant, auxiliary desiccant, hardening agent, thickener, dispersant, filler and the like, and further adding a solvent or a diluent thereto, followed by sufficient mixing.

As the ink vehicle, there can be used various types of oils such as linseed oil, soybean oil and synthetic drying oils; natural or processed resins such as rosin, copal, dammar, cured rosin, rosin esters and polymerized rosin; synthetic resins such as rosin-modified phenol resins, phenol resins, maleic acid resins, alkyd resins, petroleum resins, vinyl resins, acrylic resins, polyamide resins, epoxy resins and amino-alkyd resins; cellulose derivatives such as nitrocellulose, ethyl cellulose and cellulose acetate; derivatives such as cyclized rubber; glues, casein, dextrin, zein, etc.

Known ink printing methods such as gravure printing, dry offset printing, anastatic printing, silk screen printing, etc., can be used. Transfer printing method is also usable.

The picture-printed layer may comprise a single layer or may have a laminate structure of two layers or more.

In the decorative sheet and laminate according to the third and fourth embodiments of the present invention, it is preferable that the migration value on the side of the film layer which contacts with the picture-printed layer, as explained in the first and second aspects of the invention, is preferably within the range of 0 to 30.

As mentioned above, the decorative sheets and plates of the third and fourth aspects are used as facing material, especially for surface decoration of the fixtures such as doors. Doors are subject to frequent contact with various objects as mentioned above. Therefore, if the surface of the decorative sheet is soft, it can be easily scratched, thereby lowering the decorative value of the decorative sheet and laminate. Therefore, the outermost surface hardened layer of the decorative sheets and plates is required to have sufficient hardness to defy scratching.

The outermost surface hardened layer of the decorative sheet according to the third aspect of the present invention and the decorative plate according to the fourth aspect have a Rockwell hardness of 40 to 130, preferably 50 to 125. If the Rockwell hardness is less than 40, the surface layer may be easily scratched on contact with an object. The maximum Rockwell hardness is 130 under the testing method used.

The surface hardened layer may be a hard coating layer formed by printing, a transparent hardened layer formed by extrusion lamination, or a transparent resin film formed by lamination.

Heat-curing resins, two-pack reaction curing resins, actinic ray-curing resins and the like can be used for hard coating. The "actinic rays" referred to herein mean the electromagnetic waves capable of polymerizing the acrylic vinyl groups, such as ultraviolet rays, electron rays and radiant rays.

The heat-curing resins usable in the invention include epoxy resins, melamine resins, polyurethane resins, unsaturated polyester resins, polysiloxane resins and the like. As the two-pack reaction curing resin, a polyurethane resin blended with an isocyanate curing agent may be used.

The actinic ray-curing resins include those comprising an acrylic oligomer as actinic ray polymerization component and a reactive diluent, which may contain optionally a photopolymerization initiator, a photosensitizer and a modifier. The acrylic oligomers usable here include those having an acrylic resin skeleton with reactive acrylic groups bonded thereto, polyester acrylics, urethane acrylics, epoxy acrylics, polyether acrylics and the like. It is also possible to use the acrylic oligomers having a rigid skeleton such as melamine or isocyanuric acid with acrylic groups bonded thereto. The "reactive diluent" referred to herein is a diluent which has the function of a solvent in the coating step as a medium of the coating material and which itself has the groups reactable with the monofunctional or polyfunctional acrylic oligomers and can serve as a copolymerization component of the coating film. In the case of crosslinking by ultraviolet rays, it is preferable to use a photopolymerization initiator and a sensitizer for effecting conversion of light energy or expediting initiation of reaction because of small light energy. Examples of these acrylic oligomers, reactive diluents, photopolymerization initiators, sensitizers and crosslinking devices are described in S. Yamashita & T. Kaneko: Handbook of Crosslinking Agents, pp. 267–275, 562–593, Taiseisha, 1981.

The method for forming the hard coat is not specified in the present invention; any known suitable coating method can be used. As for the method for hardening the coat, in case of using a heat-curing resin or a two-pack curing resin, there can be used an ordinary external heat drying system such as hot-air drying or an electromagnetic wave heat drying system such as infrared drying. Also, conventional curing methods, such as electron ray or ultraviolet ray irradiation, can be used for curing the actinic ray-curing resins.

The hard coat thickness is preferably 0.5 to 200 $\mu$m. Further, in the case of using heat-curing resins and two-pack curing resins for the hard coat layer, the hard coat thickness is more preferably 5 to 20 $\mu$m. Still further, in the case of using actinic ray-curing resins for the hard coat layer, the hard coat thickness is more preferably 10 to 100 $\mu$m. When the hard coat thickness is less than 0.5 $\mu$m, the damage preventive effect tends to lower, and when it exceeds 200 $\mu$m, the hard coat may be cracked to cause whitening thereof when a bending work is conducted on the hard coated decorative sheet.

It is also preferable to provide a transparent hardened layer by means of extrusion lamination. Various types of resins can be used for such extrusion lamination, which resins include transparent polyethylene resins, thermoplastic acrylic resins, vinylidene polyfluoride resins, polyolefin resins, polyolefin-based elastomeric resins, polypropylene resins, polyethylene terephthalate resins, polyurethane resins, and polyurethane-based elastomeric resins. Any type of resin can be used as far as the Rockwell hardness of the hardened layer is within the range defined in the present invention.

A resin selected from those mentioned above is elasticized by an extruder, extruded in a molten state from the die head as a sheet onto a decorative sheet having a picture-printed layer, and then quenched and solidified to laminate the resin on the decorative sheet. Preferably, after the resin extruded in a molten state has been placed on the decorative sheet, the film is pressed from its both sides by the quenching and laminating rolls, whereby the film is quenched rapidly to inhibit growth of spherulites to allow maintenance of transparency and surface flatness of the film. Also, accompanied with the pressure applied to the contact area between the picture-printed layer and the coated resin sheet, the laminating force is enhanced. It is also preferable to provide unevenness on the surface of the quenching rolls as an embossed picture can be formed by transferring the said unevenness to the extrusion laminated surface hardened layer. This can further enhance the surface design quality. The hardened layer formed by melt extrusion may be either a single layer or a laminate of two layers or more. In order to improve adhesion between the melt extruded resin and the decorative sheet having a picture-printed layer, extrusion lamination may be carried out after applying an adhesive agent on the surface of the picture-printed layer.

The thickness of the hardened layer formed by extrusion lamination is preferably 2 to 200 $\mu$m, more preferably 20 to 100 $\mu$m. When the hardened layer thickness is less than 2 $\mu$m, the damage preventive effect tends to lower, while when the said thickness exceeds 200 $\mu$m, the sharpness of the picture-printed layer may be blunted by the hardened layer.

It is also preferable to provide the transparent resin film by the lamination method. As the resin of the transparent resin film to be laminated on the picture-printed layer, there can be used, for instance, polyethylene resins, cellophane, polypropylene resins, polymethyl methacrylate resins, polyester resins, polyolefin resins, nylon resins, polystyrene resins, EVOH resins, polycarbonate resins, fluorine resins, polybudene resins, polyamide resins, polyphenylene sulfide resins and the like. Any resins excepting that those generates chlorine gas when burned can be used as far as they can provide a Rockwell hardness is within the range defined in the present invention. In a decorative sheet using a vinyl chloride resin film for its surface hardened layer, although it provides with sufficient protection against damage, it causes generation of chlorine gas when burned, so that this decorative sheet is unable to satisfy the purpose of the present invention.

Conventional methods can be used for laminating a transparent resin film on the surface of the printed layer. An adhesive may be used for lamination. In case of using an adhesive, it is preferred to use an ultraviolet ray-hardening adhesive, a heat-hardening adhesive or a two-pack adhesive. Such an adhesive may be provided either on the picture-printed layer or on the side of the transparent resin film attached to the picture-printed layer. The laminate is preferably pressed by a heat pressure roller for elevating adhesion. It is also preferable to form unevenness on the pressure roller surface so that such unevenness may be transferred to the laminated transparent resin film to provide embossment which can further enhance the design quality.

The transparent resin film thickness is preferably 2 to 200 $\mu$m, more preferably 20 to 100 $\mu$m. When the film thickness is less than 2 $\mu$m, the damage preventive effect of the film tends to lower. When the film thickness exceeds 200 $\mu$m, sharpness of the picture-printed layer may be blunted by the transparent resin film.

According to the present invention, the request for a decorative sheet and laminate proof against damage by contact with other objects is fulfilled. The decorative sheets and plates of the present invention are particularly suited for use as facing of the construction materials having flat surfaces such as doors and furniture.

As described above, according to the present invention, there are provided the polyester films for decorative sheets and decorative plates which have no environmental problem when incinerated, allow easy control of tonality, are resistant to transfer of color tone, are impaired in productivity, and also have excellent opacifying properties.

There are also provided the decorative sheets and plates which enable presentation of a surface picture with a design quality without being affected by the tint of the base and are highly proof against damage by contact with other objects. Thus, the present invention is of very high industrial value.

EXAMPLES

The present invention is described hereinafter in further detail with reference to the examples thereof. It should be noted, however, that these examples are merely intended to be illustrative and not to be construed as limiting the scope of the invention in any way. In the following Examples and Comparative Examples, all "parts" and "%" are by weight unless otherwise noted.

(1) Transmission Density

Transmission density under G-filter was measured by using a Macbeth densitomer (TD-904). A larger value of transmission density signifies a higher opacifying power.

(2) Color Tone

Color tone was measured as L value, a value and b value according to the method of JIS Z 8722 using a color analyzer (TC-1800MK-II mfd. by Tokyo Denshoku KK).

(3) Migration Value

Determined by the migration test described above.

(4) Properties of Decorative Plates

<Evaluation of Woodgrain Picture (Design Quality)>

A decorative sheet was laminated to a plane base (plywood) having a black surface to produce a decorative plate, and the change in color tone of the woodgrain picture printed on the decorative sheet was observed. ○ mark represents the samples which maintained the original design quality, X mark represents the samples which suffered an excessive change of color tone and were deteriorated in design quality, and Δ mark represents the samples rated to be intermediate between the ○ and X marked samples. ⊚ mark indicates that the original design quality was maintained extraordinarily well.

Of these, ⊚, ○ or Δ is required in the present invention.

<Fouling of Rolls>

In order that the degree of fouling of the rolls during printing of the decorative sheets may be easily judged, a white Teflon rubber roll with a rubber hardness of 60 was set on the opposite side of the picture-printed layer in the drying step, and the degree of color transfer from the film layer to the Teflon rubber roll was examined. ○ mark indicates only a slight degree of fouling of the roll, X mark indicates heavy fouling of the roll, and Δ mark indicates the intermediate degree of fouling of the roll. ⊚ mark represents absolutely no fouling of the roll.

Of these, ⊚, ○ or Δ is required in the present invention.

<Change of Color Tone>

The color tone on the side of the film layer opposite from the picture-printed layer after printing was compared with that of the samples before printing. ○ indicates no change of color tone. X indicates excessive change of color tone. Δ indicates intermediate.

Of these, ⊚, ○ or Δ is required in the present invention.

<Embossing Workability>

Embossing workability was evaluated by carrying out embossing on the decorative sheet surface at 150° C. with a roll having protuberances on its surface. ○ mark indicates that embossing work could be carried out with ease, X mark indicates that it was hard to carry out embossing, and ⊚ mark indicates that embossing work could be performed very smoothly.

Of these, ⊚, ○ or Δ is required in the present invention.

(5) Comprehensive Assessment

Comprehensive assessment was made according to the three-grade (⊚, ○ and X) rating system in view of the results of the above test items.

Of these, ⊚ or ○ is required in the present invention.

(6) Rockwell Hardness

Hardness of the surface hardened layer was measured according to JIS-K 7202, using M scale.

(7) Scratch Protective Properties

The decorative sheet surface was scratched with a coin. The result was indicated by ⊚ mark when no scratch was given to the sheet; ○ mark when slight scratch was given to the sheet; X mark when scratch was given evidently to the sheet; and Δ mark when the assessment was intermediate between ○ and X.

Of these, ⊚, ○ or Δ is required in the present invention.

The polyester materials used in the following Examples and Comparative Examples were produced by the methods described below.

<Polyester A>

100 parts of dimethyl terephthalate, 70 parts of ethylene glycol and 0.07 part of calcium acetate monohydrate were supplied into a reactor and heated to evaporate away methanol and carry out an ester exchange reaction. The reaction mixture was heated to 230° C. in about 4.5 hours after start of the reaction to substantially complete the ester exchange reaction. After adding 0.04 part of phosphoric acid and 0.035 part of antimony trioxide, the mixture was polymerized in the usual way. Namely, the reaction temperature was raised gradually till finally reaching 280° C. while the pressure was gradually reduced till finally reaching 0.05 mmHg. The reaction was ended in 4 hours and the reaction product was worked into chips by the conventional method to obtain polyester (A).

<Polyester B>

40 parts of polyester (A) obtained in the manner described above and 60 parts of rutile titanium dioxide were melt mixed in a twin-screw extruder and chipped according to the conventional method to obtain masterbatch polyester chips (B).

<Polyester C>

34.4 parts of polyester (A), 60 parts of rutile titanium dioxide, 3.5 parts of anthraquinone as yellow pigment, 0.1 part of carbon black and 2.0 parts of iron oxide were melt mixed in a twin-screw extruder and chipped according to the conventional method to obtain masterbatch polyester chips (C).

<Polyester D>

51.9 parts of polyester (A), 26 parts of rutile titanium dioxide, 12 parts of titanium yellow, 10 parts of yellowish brown iron oxide and 0.1 part of carbon black were melt mixed in a twin-screw extruder and chipped according to the conventional method to obtain masterbatch polyester chips (D).

<Polyester E>

39.92 parts of polyester (A), 50 parts of rutile titanium dioxide, 8.3 parts of anthraquinone as yellow pigment, 0.08 part of carbon black and 1.7 parts of iron oxide were melt mixed in a twin-screw extruder and chipped according to the conventional method to obtain masterbatch polyester chips (E).

<Polyester F>

42.62 parts of polyester (A), 50 parts of rutile titanium dioxide, 5.6 parts of anthraquinone as yellow pigment, 0.08 part of carbon black and 1.7 parts of iron oxide were melt mixed in a twin-screw extruder and chipped according to the conventional method to obtain masterbatch polyester chips (F).

<Polyester G>

39.9 parts of polyester (A), 60 parts of rutile titanium dioxide and 0.1 part of phthalocyanine blue as blue pigment were melt mixed in a twin-screw extruder and chipped according to the conventional method to obtain masterbatch polyester chips (G).

<Polyester H>

Polyester (H) was obtained by the same method as used for the production of polyester (A) except that 0.1 part by weight of silica particles having an average size of 2.31 μm were added after completion of ester exchange.

Example 1

88 parts of polyester (A) and 12 parts of polyester (B) were dried separately at 180° C. for 5 hours, and then they were mixed, melt extruded by the conventional method, rapidly quenched and solidified, then stretched 2.9 times in the machine direction at 83° C., further stretched 3.2 times in the transverse direction at 125° C., and then heat-treated at 210° C. to obtain a 50 μm biaxially oriented polyester film. The properties of this polyester film are shown in Table 1. It showed excellent suitability for application to decorative plates.

Example 2

The same procedure as defined in Example 1 was conducted except for use of polyester chips (C) in place of polyester chips (B) to obtain a biaxially oriented polyester film. The properties of the obtained polyester film are shown in Table 1. It showed excellent suitability for application to decorative plates.

Example 3

The same procedure as defined in Example 1 was conducted except for use of a composition consisting of 4 parts of polyester chips (B), 13 parts of polyolefin and 83 parts of polyester chips (A) to obtain a biaxially oriented polyester film. The properties of the obtained polyester film are shown in Table 1. It showed excellent suitability for application to decorative plates.

Example 4

The same procedure as defined in Example 1 was conducted except for use of a composition comprising 76 parts of polyester chips (A) and 24 parts of polyester chips (D) to obtain a biaxially oriented polyester film. The properties of the obtained polyester film are shown in Table 1. This film showed excellent suitability for application to decorative plates.

Example 5

85.5 parts of polyester chips (A) and 14.5 parts of polyester chips (E) were dried separately at 180° C. for 5 hours, and then they were mixed and transferred into a main extruder set at 285° C. Separately, polyester (H) was dried at 180° C. for 5 hours and transferred into a sub-extruder set at 285° C. The polyester (H) in the sub-extruder was forked into the front and back layers (outermost layers) of the film, then joined at the feedblock with the polyester brought from the main extruder through a gear pump and a filter, extruded into a sheet, rapidly quenched and solidified, then stretched 2.9 times in the machine direction at 83° C. and 3.2 times in the transverse direction at 125° C. successively, and heat-treated 210° C. to obtain a biaxially oriented polyester film having a 2.0 μm/46.0 μm/2.0 μm thick three-layer structure. The properties of the obtained polyester film are shown in Table 1. This film showed excellent suitability for application to decorative plates.

Example 6

A biaxially oriented polyester film was obtained by conducting the same procedure as defined in Example 5 except that a composition comprising 76 parts of polyester chips (A) and 24 parts of polyester chips (D) was supplied in place of polyester (H) into the sub-extruder. The properties of the obtained polyester film are shown in Table 1. This film showed excellent suitability for application to decorative plates.

Example 7

The same procedure as defined in Example 1 was conducted except for use of a composition comprising 85.5 parts of polyester chips (A) and 14.5 parts of polyester chips (F) to obtain a biaxially oriented polyester film. The properties of the obtained polyester film are shown in Table 1. This film showed excellent suitability for application to decorative plates.

Comparative Example 1

The same procedure as defined in Example 1 was conducted except for use of a composition consisting of 85.5 parts of polyester chips (A) and 14.5 parts of polyester chips (E) to obtain a biaxially oriented polyester film. The properties of the obtained polyester film are shown in Table 1. The decorative sheet using this polyester film suffered excessive transfer of the color of the film surface to the Teflon rubber rolls and was bad in suitability for application to decorative plates.

TABLE 1

|  | Example 1 | Example 2 | Example 3 | Example 4 |
| --- | --- | --- | --- | --- |
| Transmission density | 0.50 | 1.52 | 0.70 | 1.97 |
| Migration value | 0.5 | 13.0 | 2.0 | 0.5 |
| b value of chromaticity | 1.0 | 25.1 | -4.0 | 28.3 |
| Evaluation of woodgrain picture | ○ | ◎ | ○ | ◎ |
| Fouling of roll | ◎ | ○ | ◎ | ◎ |
| Change of color tone | ○ | ○ | ○ | ○ |
| Embossing workability | ○ | ○ | ◎ | ○ |
| Comprehensive assessment | ○ | ◎ | ○ | ◎ |

|  | Example 5 | Example 6 | Example 7 | Comp. Example 1 |
| --- | --- | --- | --- | --- |
| Transmission density | 1.46 | 1.50 | 1.50 | 1.48 |
| Migration value | 0.5 | 0.5 | 25.0 | 35.0 |
| b value of chromaticity | 30.0 | 28.0 | 27.5 | 30.0 |
| Evaluation of woodgrain picture | ◎ | ◎ | ◎ | ◎ |
| Fouling of roll | ◎ | ◎ | △ | X |
| Change of color tone | ○ | ○ | △ | X |
| Embossing workability | ○ | ○ | ○ | ○ |
| Comprehensive assessment | ◎ | ◎ | ○ | X |

Example 8

88 parts of polyester chips (A) and 12 parts of polyester chips (B) were dried separately at 180° C. for 5 hours, and then they were mixed, melt extruded in the usual way, rapidly quenched and solidified, then stretched 2.9 times in the machine direction at 83° C. and 3.2 times in the transverse direction at 125° C. successively, and then heat treated at 210° C. to obtain a 50 μm biaxially oriented polyester film. A nitrocellulose ink (Cellocolor (brown) produced by Toyo Ink Manufacturing Co., Ltd.) was applied on the obtained polyester film to a dry thickness of 3 μm and dried in an 80° C. hot-air drying oven for one minute to form a picture-printed layer. A polyurethane acrylate type ultraviolet-hardening ink (Unideck 17-806 Series produced by Dainippon Ink and Chemicals, Inc.) was applied on the said picture-printed layer by a bar coater, preliminarily dried at 60° C. for 5 minutes, and hardened by an ultraviolet-light irradiator (UVH-2000, mfd. by Ushio Electric Co., Ltd.) under the conditions of 50 W/cm, irradiation distance of 15 cm and irradiation time of 5 seconds to form a hardened layer, thereby obtaining a decorative sheet. The properties of the obtained decorative sheet are shown in Table 2. This decorative sheet showed excellent suitability for application to decorative plates.

Example 9

The same procedure as defined in Example 8 was conducted except for use of a composition comprising 4 parts of polyester chips (B), 13 parts of polyolefin and 83 parts of polyester chips (A) to obtain a biaxially oriented polyester film. Using this polyester film, a picture-printed layer and an ultraviolet-hardened surface layer were formed in the same way as in Example 8. The properties of the obtained decorative sheet are shown in Table 2. This decorative sheet showed good suitability for application to decorative plates.

Example 10

The same procedure as defined in Example 8 was conducted except for use of polyester chips (C) in place of polyester chips (B) to obtain a biaxially oriented polyester film. Then a picture-printed layer was formed in the same way as in Example 8, and a polyethylene resin was melt extruded from a T-die and immediately laminated on the said picture-printed layer by nipping it by a chrome-plated cooling roll having its surface temperature set at 23° C. and a rubber roll. The polyethylene resin thickness was adjusted to be 50 μm. The properties of the obtained decorative sheet are shown in Table 2. This decorative sheet showed excellent suitability for application to decorative plates.

Example 11

The same procedure as defined in Example 8 was conducted except for use of a composition comprising 76 parts of polyester chips(A) and 24 parts of polyester chips (D) to obtain a biaxially oriented polyester film. A picture-printed layer was formed in the same way as in the preceding examples, and a two-pack urethane adhesive (produced by Toyo Ink Manufacturing Co., Ltd.) was bar coated on the said picture-printed layer to a thickness of 5 μm (on dry base) and dried in a drying oven at about 70° C. for one minute. A 50 μm thick transparent polyethylene terephthalate (T100-50 produced by Diafoil Hoechst Company, Limited) was placed on the said adhesive layer and laminated by a laminator with a roll temperature of about 120° C. to obtain a decorative sheet. The properties of the obtained decorative sheet are shown in Table 2. This decorative sheet showed excellent suitability for application to decorative plates.

Comparative Example 2

A decorative sheet was obtained by conducting the same procedure as defined in Example 8 except for use of a composition comprising 99 parts of polyester chips (A) and one part of polyester chips (B). This decorative sheet, when applied to a decorative plate, suffered a change of color tone under the influence of black color of the plywood constituting the plane base and was lowered in its design quality. It was thus unsuited for application to decorative plates.

Comparative Example 3

It was tried to obtain a biaxially oriented polyester film by conducting the same procedure as defined in Example 8 except that the amount of polyester chips (B) blended was changed so that transmission density of the polyester film would become 6.0, but it was unable to obtain the desired film because of frequent occurrence of film break during stretching in the transverse direction.

Comparative Example 4

A decorative sheet was obtained by conducting the same procedure as defined in Example 8 except for use of polyester chips (G) in place of polyester chips (B). This decorative sheet suffered a change of hue of the picture-printed layer because of low b value and too strong bluish tint of the polyester film, and was unsuited for application to decorative plates.

Comparative Example 5

The procedure of Example 8 was followed till formation of the picture-printed layer. Then a transparent nitrocellulose ink (cellocolor (medium) produced by Toyo Ink Manufacturing Co., Ltd.) was applied on the said picture-printed layer to a dry base thickness of 10 Mm and dried in an 80° C. hot-air drying oven for 5 minutes to form the outermost surface hardened layer. In the scratch resistance test, the obtained decorative sheet was easily scratched and unsuited for application to decorative plates.

TABLE 2

|  | Example 8 | Example 9 | Example 10 | Example 11 |
|---|---|---|---|---|
| <Transmission density> | 0.50 | 0.50 | 1.52 | 1.97 |
| <b value of chromaticity> | 1.0 | −4.0 | 25.1 | 28.3 |
| <Hardness> |  |  |  |  |
| Rockwell hardness | 120 | 120 | 50 | 100 |
| <Suitability for application to decorative plates> |  |  |  |  |
| Scratch resistance | ◉ | ◉ | ○ | ◉ |
| Design quality | ○ | ▲ | ○ | ○ |
| Embossing workability | ○ | ◉ | ◉ | ◉ |
| <Comprehensive assessment> | ◉ | ○ | ◉ | ◉ |

|  | Comparative Example 2 | Comparative Example 4 | Comparative Example 5 |
|---|---|---|---|
| <Transmission density> | 0.05 | 0.50 | 0.50 |
| <b value of chromaticity> | 1.0 | −30.0 | 1.0 |
| <Hardness> |  |  |  |
| Rockwell hardness | 120 | 120 | 30 |
| <Suitability for application to decorative plates> |  |  |  |
| Scratch resistance | ◉ | ◉ | X |
| Design quality | X | X | ○ |
| Embossing workability | ○ | ○ | ○ |
| <Comprehensive assessment> | X | X | X |

What is claimed is:

1. A decorative sheet comprising at least a polyester film layer and a picture-printed layer laminated on the polyester film layer, a migration value in the surface of the polyester film layer which contacts with the picture-printed layer being 0 to 30, and wherein transmission density of the polyester film layer is 0.1 to 5.0 and the b value of chromaticity of the polyester film layer is −5.0 or more.

2. A decorative plate comprising at least a polyester film layer and a picture-printed layer which are laminated successively in this order on the surface of a base, a migration value of the surface of the polyester film layer which contacts with the picture-printed layer being 0 to 30, and wherein transmission density of the polyester film layer is 0.1 to 5.0 and the b value of chromaticity of the polyester film layer is −5.0 or more.

3. A decorative sheet comprising a polyester film layer, a picture-printed layer and a surface hardened layer which are laminated successively in this order, a transmission density of said polyester film layer being 0.1 to 5.0, the b value of chromaticity being −5.0 or more, and the Rockwell hardness of said surface hardened layer being 40 to 130.

4. A decorative sheet according to claim 3, wherein the migration value on the side of the polyester film layer which contacts with the picture-printed layer is 0 to 30.

5. A decorative plate comprising a polyester film layer, a picture-printed layer and a surface hardened layer which are laminated successively in this order on the surface of a base, a transmission density of said polyester film layer being 0.1 to 5.0, the b value of chromaticity being −5.0 or more, and the Rockwell hardness of said surface hardened layer being 40 to 130.

6. A decorative plate according to claim 5, wherein the migration value on the side of the polyester film layer which contacts with the picture-printed layer is 0 to 30.

* * * * *